United States Patent
Johnson (10) Patent No.: US 9,027,043 B2
(45) Date of Patent: May 5, 2015

(54) METHODS AND APPARATUS TO DETECT AN OPERATING STATE OF A DISPLAY

(75) Inventor: Karin A. Johnson, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 2082 days.

(21) Appl. No.: 11/388,262

(22) Filed: Mar. 24, 2006

(65) Prior Publication Data

US 2006/0212895 A1    Sep. 21, 2006

Related U.S. Application Data

(63) Continuation of application No. PCT/US03/30355, filed on Sep. 25, 2003.

(51) Int. Cl.
| | | |
|---|---|---|
| *H04N 7/173* | (2011.01) | |
| *H04H 60/32* | (2008.01) | |
| *H04N 21/422* | (2011.01) | |
| *H04N 21/442* | (2011.01) | |
| *H04N 21/658* | (2011.01) | |
| *H04N 5/445* | (2011.01) | |

(52) U.S. Cl.
CPC .............. *H04H 60/32* (2013.01); *H04N 21/422* (2013.01); *H04N 21/44222* (2013.01); *H04N 21/6581* (2013.01)

(58) Field of Classification Search
USPC ................................ 725/9, 12, 14–15, 17, 19
See application file for complete search history.

(56) References Cited

U.S. PATENT DOCUMENTS

| | | |
|---|---|---|
| 3,281,695 A | 10/1966 | Bass |
| 3,315,160 A | 4/1967 | Goodman |
| 3,483,327 A | 12/1969 | Schwartz |
| 3,651,471 A | 3/1972 | Haselwood et al. |
| 3,733,430 A | 5/1973 | Thompson et al. |
| 3,803,349 A | 4/1974 | Watanabe |
| 3,906,454 A | 9/1975 | Martin |

(Continued)

FOREIGN PATENT DOCUMENTS

| | | |
|---|---|---|
| DE | 3401762 | 8/1985 |
| EP | 0593202 | 4/1994 |

(Continued)

OTHER PUBLICATIONS

International Search Report corresponding to International Application Serial No. PCT/US2003/030355, May 5, 2004, 6 sheets.

(Continued)

*Primary Examiner* — Pankaj Kumar
*Assistant Examiner* — Reuben M Brown
(74) *Attorney, Agent, or Firm* — Hanley, Flight and Zimmerman, LLC (57) ABSTRACT

Methods and apparatus to detect an operating state of a display are disclosed. An example device to detect an operating state of a display includes an optical fiber, an optical-to-electrical converter, and a logic circuit. The optical fiber is optically coupled to a light source of the display. The light energy source is configured to emit light. The optical-to-electrical converter is coupled to the light source via the optical fiber and configured to convert light from the light source into an electrical signal. The logic circuit is coupled to the optical-to-electrical converter and configured to generate an output signal indicative of the operating state of the display based on the electrical signal.

26 Claims, 3 Drawing Sheets

(56) References Cited

U.S. PATENT DOCUMENTS

| | | | |
|---|---|---|---|
| 3,947,624 A | 3/1976 | Miyake | |
| 4,027,332 A | 5/1977 | Wu et al. | |
| 4,044,376 A | 8/1977 | Porter | |
| 4,058,829 A * | 11/1977 | Thompson | 725/14 |
| 4,245,245 A | 1/1981 | Matsumoto et al. | |
| 4,388,644 A | 6/1983 | Ishman et al. | |
| 4,546,382 A | 10/1985 | McKenna et al. | |
| 4,566,030 A | 1/1986 | Nickerson et al. | |
| 4,574,304 A | 3/1986 | Watanabe et al. | |
| 4,613,904 A | 9/1986 | Lurie | |
| 4,622,583 A * | 11/1986 | Watanabe et al. | 725/14 |
| 4,642,685 A | 2/1987 | Roberts et al. | |
| 4,644,393 A | 2/1987 | Smith et al. | |
| 4,647,964 A | 3/1987 | Weinblatt | |
| 4,697,209 A | 9/1987 | Kiewit et al. | |
| 4,723,302 A | 2/1988 | Fulmer et al. | |
| 4,764,808 A | 8/1988 | Solar | |
| 4,769,697 A | 9/1988 | Gilley et al. | |
| 4,779,198 A | 10/1988 | Lurie | |
| 4,800,437 A | 1/1989 | Hosoya | |
| 4,807,031 A | 2/1989 | Broughton et al. | |
| 4,876,736 A | 10/1989 | Kiewit | |
| 4,885,632 A | 12/1989 | Mabey et al. | |
| 4,907,079 A | 3/1990 | Tumer et al. | |
| 4,912,552 A | 3/1990 | Allison, III et al. | |
| 4,931,865 A | 6/1990 | Scarampi | |
| 4,943,963 A | 7/1990 | Waechter et al. | |
| 4,965,825 A | 10/1990 | Harvey et al. | |
| 4,972,503 A | 11/1990 | Zurlinden | |
| 5,097,328 A | 3/1992 | Boyette | |
| 5,136,644 A | 8/1992 | Audebert et al. | |
| 5,165,069 A | 11/1992 | Vitt et al. | |
| 5,226,177 A | 7/1993 | Nickerson | |
| 5,235,414 A | 8/1993 | Cohen | |
| 5,251,324 A | 10/1993 | McMullan, Jr. | |
| 5,310,222 A | 5/1994 | Chatwin et al. | |
| 5,319,453 A | 6/1994 | Copriviza et al. | |
| 5,335,277 A | 8/1994 | Harvey et al. | |
| 5,355,161 A | 10/1994 | Bird et al. | |
| 5,398,055 A | 3/1995 | Nonomura et al. | |
| 5,404,161 A | 4/1995 | Douglass et al. | |
| 5,404,172 A | 4/1995 | Berman et al. | |
| 5,408,258 A * | 4/1995 | Kolessar | 725/14 |
| 5,425,100 A | 6/1995 | Thomas et al. | |
| 5,481,294 A | 1/1996 | Thomas et al. | |
| 5,483,276 A | 1/1996 | Brooks et al. | |
| 5,488,408 A | 1/1996 | Maduzia et al. | |
| 5,505,901 A | 4/1996 | Harney et al. | |
| 5,512,933 A | 4/1996 | Wheatley et al. | |
| 5,550,928 A | 8/1996 | Lu et al. | |
| 5,659,367 A | 8/1997 | Yuen | |
| 5,760,760 A | 6/1998 | Helms | |
| 5,767,922 A | 6/1998 | Zabih et al. | |
| 5,771,307 A | 6/1998 | Lu et al. | |
| 5,801,747 A | 9/1998 | Bedard | |
| 5,874,724 A | 2/1999 | Cato | |
| 5,889,548 A | 3/1999 | Chan | |
| 5,896,554 A | 4/1999 | Itoh | |
| 5,963,844 A | 10/1999 | Dail | |
| 6,035,177 A | 3/2000 | Moses et al. | |
| 6,049,286 A | 4/2000 | Forr | |
| 6,124,877 A | 9/2000 | Schmidt | |
| 6,137,539 A | 10/2000 | Lownes et al. | |
| 6,177,931 B1 | 1/2001 | Alexander et al. | |
| 6,184,918 B1 | 2/2001 | Goldschmidt Iki et al. | |
| 6,286,140 B1 | 9/2001 | Ivanyi | |
| 6,297,859 B1 | 10/2001 | George | |
| 6,311,214 B1 * | 10/2001 | Rhoads | 709/217 |
| 6,388,662 B2 | 5/2002 | Narvi et al. | |
| 6,400,996 B1 | 6/2002 | Hoffberg et al. | |
| 6,457,010 B1 | 9/2002 | Eldering et al. | |
| 6,463,413 B1 | 10/2002 | Applebaum et al. | |
| 6,467,089 B1 | 10/2002 | Aust et al. | |
| 6,477,508 B1 | 11/2002 | Lazar et al. | |
| 6,487,719 B1 | 11/2002 | Itoh et al. | |
| 6,519,769 B1 * | 2/2003 | Hopple et al. | 725/14 |
| 6,523,175 B1 | 2/2003 | Chan | |
| 6,529,212 B2 | 3/2003 | Miller et al. | |
| 6,542,878 B1 | 4/2003 | Heckerman et al. | |
| 6,567,978 B1 | 5/2003 | Jarrel | |
| 6,570,559 B1 | 5/2003 | Oshima | |
| 6,647,212 B1 | 11/2003 | Toriumi et al. | |
| 6,647,548 B1 | 11/2003 | Lu et al. | |
| 6,675,383 B1 | 1/2004 | Wheeler et al. | |
| 6,681,396 B1 | 1/2004 | Bates et al. | |
| 6,791,472 B1 | 9/2004 | Hoffberg | |
| 6,934,508 B2 | 8/2005 | Ceresoli et al. | |
| 6,946,803 B2 * | 9/2005 | Moore | 315/169.4 |
| 7,051,352 B1 | 5/2006 | Schaffer | |
| 7,100,181 B2 | 8/2006 | Srinivasan et al. | |
| 7,150,030 B1 | 12/2006 | Eldering et al. | |
| 7,786,987 B2 | 8/2010 | Nielsen | |
| 2002/0012353 A1 | 1/2002 | Gerszberg et al. | |
| 2002/0015112 A1 | 2/2002 | Nagakubo et al. | |
| 2002/0026635 A1 | 2/2002 | Wheeler et al. | |
| 2002/0056087 A1 | 5/2002 | Berezowski et al. | |
| 2002/0057893 A1 | 5/2002 | Wood et al. | |
| 2002/0059577 A1 | 5/2002 | Lu et al. | |
| 2002/0072952 A1 | 6/2002 | Hamzy et al. | |
| 2002/0077880 A1 | 6/2002 | Gordon et al. | |
| 2002/0080286 A1 | 6/2002 | Dagtas et al. | |
| 2002/0083435 A1 | 6/2002 | Blasko | |
| 2002/0141730 A1 | 10/2002 | Haken | |
| 2002/0174425 A1 | 11/2002 | Markel et al. | |
| 2002/0198762 A1 | 12/2002 | Donato | |
| 2003/0046685 A1 | 3/2003 | Srinivasan et al. | |
| 2003/0054757 A1 | 3/2003 | Kolessar et al. | |
| 2003/0056215 A1 | 3/2003 | Kanungo | |
| 2003/0067459 A1 | 4/2003 | Lim | |
| 2003/0093790 A1 | 5/2003 | Logan et al. | |
| 2003/0101449 A1 | 5/2003 | Bentolila et al. | |
| 2003/0110485 A1 | 6/2003 | Lu et al. | |
| 2003/0115591 A1 * | 6/2003 | Weissmueller et al. | 725/22 |
| 2003/0131350 A1 | 7/2003 | Peiffer et al. | |
| 2003/0216120 A1 | 11/2003 | Ceresoli et al. | |
| 2004/0003394 A1 | 1/2004 | Ramaswamy | |
| 2004/0055020 A1 | 3/2004 | Delpuch | |
| 2004/0058675 A1 | 3/2004 | Lu et al. | |
| 2004/0073918 A1 | 4/2004 | Ferman et al. | |
| 2004/0088212 A1 | 5/2004 | Hill | |
| 2004/0088721 A1 | 5/2004 | Wheeler et al. | |
| 2004/0100437 A1 | 5/2004 | Hunter et al. | |
| 2004/0210922 A1 | 10/2004 | Peiffer et al. | |
| 2004/0233126 A1 * | 11/2004 | Moore | 345/60 |
| 2005/0054285 A1 | 3/2005 | Mears et al. | |
| 2005/0057550 A1 | 3/2005 | George | |
| 2005/0125820 A1 | 6/2005 | Nelson et al. | |
| 2005/0221774 A1 | 10/2005 | Ceresoli et al. | |
| 2005/0286860 A1 | 12/2005 | Conklin | |
| 2006/0075421 A1 | 4/2006 | Roberts et al. | |
| 2006/0093998 A1 | 5/2006 | Vertegaal | |
| 2006/0195857 A1 | 8/2006 | Wheeler et al. | |
| 2006/0212895 A1 | 9/2006 | Johnson | |
| 2006/0232575 A1 | 10/2006 | Nielsen | |
| 2007/0063850 A1 | 3/2007 | Devaul et al. | |
| 2007/0186228 A1 | 8/2007 | Ramaswamy et al. | |
| 2007/0192782 A1 | 8/2007 | Ramaswamy | |
| 2008/0028427 A1 | 1/2008 | Nesvadba et al. | |
| 2008/0148307 A1 | 6/2008 | Nielsen et al. | |
| 2008/0276265 A1 | 11/2008 | Topchy et al. | |

FOREIGN PATENT DOCUMENTS

| | | |
|---|---|---|
| EP | 0946012 | 9/1999 |
| EP | 1318679 | 6/2003 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 95/26106 | 9/1995 |
| WO | 9526106 | 9/1995 |
| WO | 9810539 | 3/1998 |
| WO | 99/33206 | 7/1999 |

(56) References Cited

FOREIGN PATENT DOCUMENTS

| WO | 9933206 | 7/1999 |
|---|---|---|
| WO | 9959275 | 11/1999 |
| WO | 0038360 | 6/2000 |
| WO | WO 00/38360 A1 | 6/2000 |
| WO | 00/72484 | 11/2000 |
| WO | 0111506 | 2/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03/060630 | 7/2003 |
| WO | 03060630 | 7/2003 |
| WO | 2005032145 | 4/2005 |
| WO | 2005038625 | 4/2005 |
| WO | 2005/041166 | 5/2005 |
| WO | WO 2005/041166 | 5/2005 |
| WO | 2005/055601 | 6/2005 |
| WO | 2005055601 | 6/2005 |
| WO | 2005065159 | 7/2005 |
| WO | 2005079457 | 9/2005 |
| WO | 2006012629 | 2/2006 |
| WO | 2007120518 | 10/2007 |

OTHER PUBLICATIONS

International Preliminary Report on Patentability corresponding to International Application Serial No. PCT/US2003/03070, Mar. 7, 2005, 4 pages.
International Search Report corresponding to International Patent Application Serial No. PCT/US2003/03070, Mar. 11, 2004, 7 pages.
Written Opinion corresponding to International Application Serial No. PCT/US2003/03070, Nov. 15, 2004, 5 pages.
Nielsen, Christen V., "Methods and Apparatus to Detect an Operating State of Display Based on Visible Light," U.S. Appl. No. 11/388,555, filed Mar. 24, 2006.
International Preliminary Examining Authority, Written Opinion, for counterpart PCT Application Serial No. PCT/US2003/30355 mailed on Mar. 21, 2008 (5 pages).
Thomas, William L., "Television Audience Research Technology, Today's Systems and Tomorrow's Challenges," Nielsen Media Research, Jun. 5, 1992 (4 pages).
Vincent et al., "A Tentative Typology of Audio Source Separation Tasks," 4$^{th}$ International Symposium on Independent Component Analysis and Blind Signal Separation (ICA 2003), held in Nara, Japan, Apr. 2003 (6 pages).
Smith, Leslie S., "Using IIDs to Estimate Sound Source Direction," Proceedings of the Seventh International Conference on Simulation of Adaptive Behavior on from Animals to Animats, pp. 60-61, 2002 (2 pages).
Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages).
Elkan, Charles, "Naive Bayesian Learning," Adapted from Technical Report No. CS97-557, Department of Computer Science and Engineering, University of California, San Diego, U.S.A., Sep. 1997 (4 pages).
Zhang, Harry, "The Optimality of Naive Bayes," Proceedings of the Seventeenth International FLAIRS Conference, 2004 (6 pages).
Domingos et al., "On the Optimality of the Simple Bayesian Classifier under Zero-One Loss," Machine Learning, vol. 29, No. 2, pp. 103-130, Nov. 1, 1997 (28 pages).
Patron-Perez et al., "A Probabilistic Framework for Recognizing Similar Actions using Spatio-Temporal Features," BMVC07, 2007 [Retrieved from the Internet on Feb. 29, 2008] (10 pages).
Mitchell, Tom M., "Chapter 1; Generative and Discriminative Classifiers: Naive Bayes and Logistic Regression," Machine Learning, Sep. 21, 2006 (17 pages).
Lang, Marcus, "Implementation on Naive Bayesian Classifiers in Java," http://www.iit.edu/~ipro356f03/ipro/documents/naive-bayes.edu [Retrieved from the Internet on Feb. 29, 2008] (4 pages).
Liang et al., "Learning Naive Bayes Tree for Conditional Probability Estimation," Proceedings of the Canadian AI-2006 Conference, held in Quebec, Canada, pp. 456-466, on Jun. 7-9, 2006 (13 pages).
Mozina et al., "Nomograms for Visualization of Naive Bayesian Classifier," Proceedings of the Eight European Conference on Principles and Practice of Knowledge Discovery in Databases, held in Pisa, Italy, pp. 337-348, 2004 [Retrieved from the Internet on Feb. 29, 2008] (12 pages).
"Lecture 3; Naive Bayes Classification," http://www.cs.utoronto.ca/~strider/CSCD11_f08/NaiveBayes_Zemel.pdf [Retrieved from the Internet on Feb. 29, 2008] (9 pages).
Klein, Dan, PowerPoint Presentation of "Lecture 23: Naive Bayes," CS 188: Artificial Intelligence held on Nov. 15, 2007 (6 pages).
"Learning Bayesian Networks: Naïve and non-Naïve Bayes" Oregon State University, Oregon [Retrieved from the Internet on Feb. 29, 2008]. Retrieved from the Internet: http://web.engr.oregonstate.edu/~tgd/classess/534/slides/part6.pdf (18 pages).
"The Naïve Bayes Classifier," CS534-Machine Learning, Oregon State University, Oregon [Retrieved from the Internet on Feb. 29, 2008]. Retrieved from the Internet: http://web.engr.oregonstate.edu/~afern/classes/cs534/notes/Naivebayes-10.pdf (19 pages).
"Bayesian Networks," Machine Learning A, 708.064 07 1sst KU Oregon State University, Oregon [Retrieved from the Internet on Feb. 29, 2008]. Retrieved from the Internet: http://www.igi.tugraz.at.lehre/MLA/WS07/slides3.pdf (21 pages).
"The Peltarion Blog," Jul. 10, 2006 [Retrieved from the Internet on Mar. 11, 2009] Retrieved from the Internet: http//blog.peltarion.com/2006/07/10/classifier-showdown (14 pages).
"Logical Connective: Philosophy 103: Introduction to Logic Conjunction, Negation, and Disjunction," [Retrieved from the Internet on 200-03-11] Retrieved from the Internet: http://philosophy.lander.edu/logic/conjunct.html (5 pages).
"Naïve Bayes Classifier," Wikipedia entry as of Mar. 11, 2009 [Retrieved from the Internet on Mar. 11, 2009] (7 pages).
"Naive Bayes Classifier," Wikipedia entry as of Jan. 11, 2008 [Retrieved from the Internet from Wikipedia history pages on Mar. 11, 2009] (7 pages).
Zimmerman, H., "Fuzzy set applications in pattern recognition and data-analysis," 11th IAPR International conference on Pattern Recognition, Aug. 29, 1992 (81 pages).
European Patent Office, Extended European Search Report, issued in connection with European Patent Application No. EP05798239.9, on Sep. 9, 2008 (4 pages).
Patent Cooperation Treaty, International Preliminary Report on Patentability, issued by the International Bureau in connection with PCT application No. PCT/US2005/028106, mailed Apr. 5, 2007 (5 pages).
Patent Cooperation Treaty, International Search Report, issued by the International Searching Authority in connection with PCT application No. PCT/US2005/028106, mailed Mar. 12, 2007 (2 pages).
Patent Cooperation Treaty, Written Opinion of the International Searching Authority, issued by the International Searching Authority in connection with PCT application No. PCT/US2005/028106, mailed Mar. 12, 2007 (4 pages).
Patent Cooperation Treaty, International Search Report, issued by the International Searching Authority in connection with PCT application No. PCT/US2006/031960, mailed Feb. 21, 2007 (2 pages).
Patent Cooperation Treaty, Written Opinion of the International Searching Authority, issued by the International Searching Authority in connection with PCT application No. PCT/US2006/031960, mailed Feb. 21, 2007 (3 pages).
Patent Cooperation Treaty, International Preliminary Report on Patentability, issued by the International Bureau in connection with PCT application No. PCT/US2006/031960, mailed Feb. 20, 2008 (4 pages).
Non-Final Office Action issued by the United States Patent and Trademark Office on Feb. 5, 2009, in connection with U.S. Appl. No. 11/576,328 (20 pages).
Non-Final Office Action issued by the United States Patent and Trademark Office on Dec. 27, 2007, in connection with U.S. Appl. No. 11/388,555 (12 pages).

(56) References Cited

OTHER PUBLICATIONS

Final Office Action issued by the United States Patent and Trademark Office on Oct. 6, 2008, in connection with U.S. Appl. No. 11/388,555 (18 pages).

Advisory Action issued by the United States Patent and Trademark Office on Jan. 13, 2009, in connection with U.S. Appl. No. 11/388,555 (4 pages).

The United States Patent and Trademark Office, Final Office Action, issued in connection with U.S. Appl. No. 11/388,555, mailed on Dec. 8, 2009, 16 pages.

The United States Patent and Trademark Office, Notice of Allowance, issued in connection with U.S. Appl. No. 11/388,555, mailed on May 20, 2010, 15 pages.

Official Action dated Mar. 31, 2009, in U.S. Appl. No. 11/388,555, 17 pages.

* cited by examiner

METHODS AND APPARATUS TO DETECT AN OPERATING STATE OF A DISPLAY

RELATED APPLICATION

This patent arises from a continuation of PCT Application Ser. No. PCT/US2003/030355, filed Sep. 25, 2003, which is incorporated herein by reference.

TECHNICAL FIELD

The present disclosure relates generally to audience measurement, and more particularly, to methods and apparatus to detect an operating state of a display.

BACKGROUND

Determining the size and demographics of a television viewing audience helps television program producers improve their television programming and determine a price to be charged for advertising that is broadcasted during such programming. In addition, accurate television viewing demographics allows advertisers to target audiences of a desired size and/or audiences comprised of members having a set of common, desired characteristics (e.g., income level, lifestyles, interests, etc.).

In order to collect these demographics, an audience measurement company may enlist a number of television viewers to cooperate in an audience measurement study for a predefined length of time. The viewing habits of these enlisted viewers, as well as demographic data about these enlisted viewers, are collected using automated and/or manual collection methods. The collected data is subsequently used to generate a variety of informational statistics related to television viewing audiences including, for example, audience sizes, audience demographics, audience preferences, the total number of hours of television viewing per household and/or per region, etc.

The configurations of automated data collection systems vary depending on the equipment used to receive, process, and display television signals in each home being monitored. For example, homes that receive cable television signals and/or satellite television signals typically include a set top box (STB) to receive television signals from a cable and/or satellite television provider. Television systems configured in this manner are typically monitored using hardware, firmware, and/or software to interface with the STB to extract or to generate signal information therefrom. Such hardware, firmware, and/or software may be adapted to perform a variety of monitoring tasks including, for example, detecting the channel tuning status of a tuning device disposed in the STB, extracting program identification codes embedded in television signals received at the STB, generating signatures characteristic of television signals received at the STB, etc. However, many television systems that include an STB are configured such that the STB may be powered independent of the television set. As a result, the STB may be turned on (i.e., powered up) and continue to supply television signals to the television set even when the television set is turned off. Thus, monitoring of television systems having independently powered devices typically involves an additional device or method to determine the operational status of the television set to ensure that the collected data reflects information about television signals that were merely supplied to the television set, which may or may not be turned on. Although there are a variety of techniques to determine the operational status of the television set, many of these techniques are invasive to the television set and increases unnecessary risk in damaging the television set during installation of the circuitry to determine the operational status. Further some of these techniques involve monitoring the consumption of power by the television set. Unfortunately, the consumption of power by the television set does not necessarily indicate that the television screen is operational. Other techniques to determine the operational status of the television set are complex and tend to be costly to implement.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, software, and/or firmware.

In addition, while the following disclosure discusses example television systems, it should be understood that the disclosed system is readily applicable to many other media systems. Accordingly, while the following describes example systems and processes, persons of ordinary skill in the art will readily appreciate that the disclosed examples are not the only way to implement such systems.

Figure 1:
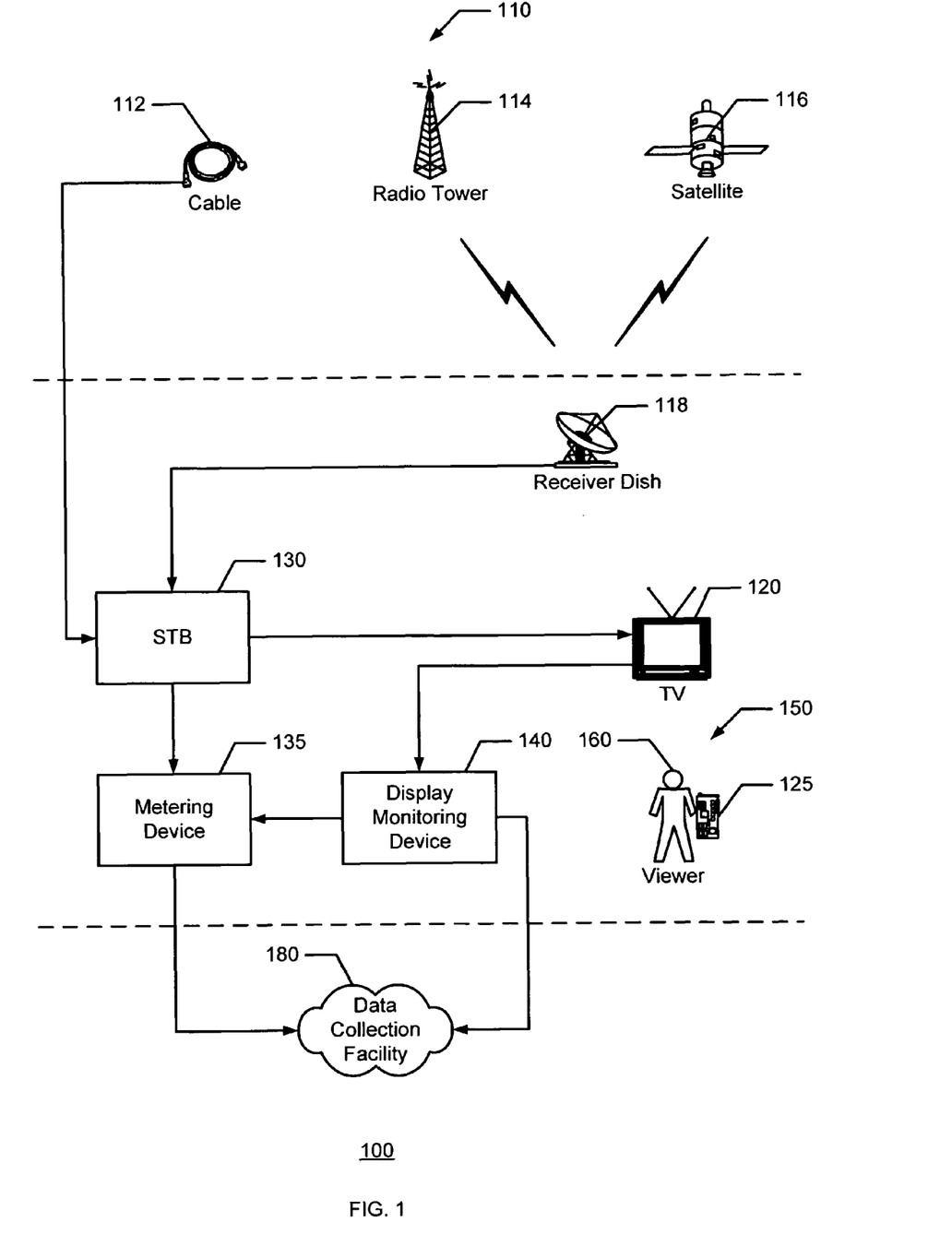
FIG. 1 is a block diagram representation of an example television system.

In the example of FIG. 1, an example broadcast system 100 including a service provider 110, a television 120, a remote control device 125, and a set top box (STB) 130 is metered using an audience measurement system. The components of the system 100 may be coupled in any well known manner. In the illustrated example, the television 120 (e.g., a cathode ray tube (CRT) television, a liquid crystal display (LCD) television, etc.) is positioned in a viewing area 150 located within a house occupied by one or more people, referred to as household members 160, all of whom have agreed to participate in an audience measurement research study. The viewing area 150 includes the area in which the television 120 is located and from which the television 120 may be viewed by one or more household members 160 located in the viewing area 150. In the illustrated example, a metering device 135 is configured to monitor the STB 130 and to collect viewing data to determine the viewing habits of the household members 160. The television 120 and the STB 130 may be powered independently such that the STB 130 may be configured to remain turned on at all times while the television 120 may be turned on or off depending on whether one or more of the household members 160 decides to watch television. Accordingly, the broadcast system 100 may also include a display monitoring device 140 configured to detect an operating state of the television 120 (i.e., on or off) and to generate data indicative of the operating state. The generated data of the operating state may then be used, for example, to supplement the data collected by the metering device 135 and/or to control the collection of data by the metering device 135. For example, television operating state data may be used to determine whether data collected by the metering device 135 corresponds to television signals that were not only supplied to the television 120 but to television signals that were actually displayed by the television 120. In another example, the television operating state data generated by the display monitoring device 140 may be used to control the operation of the metering device 135. In particular, the display monitoring device 140 may generate a control signal that causes the metering device 135 to begin collecting metering data in response to detecting that the television 120 is turned on. The display monitoring device 140 may also generate a control signal that causes the metering device 135 to stop collecting metering data in response to detecting that the television 120 is turned off. Thus, the display monitoring device 140 optimizes the amount of data collected by the metering device 135, which in turn, allows for a reduction in the amount of memory required to store metering data. Such reduction in memory may be substantial especially for systems that employ metering devices configured to generate data intensive signatures characterizing the television content.

The display monitoring device 140 may also be configured to determine the total number of hours of television watched by the household members 160. As described in detail below, the display monitoring device 140 may generate time stamps corresponding to the times at which the television 120 is turned on (i.e., begins to display content) and/or the times at which the television 120 is turned off (i.e., stops displaying content). Alternatively, the display monitoring device 140 may be configured to provide the television operating state data to the metering device 135, which in turn, generates time stamps associated with the data so that the total number of hours of television watched may be calculated therefrom. Further, the display monitoring device 140 may provide the television operating state data to the central data collection facility 180 either directly or via the metering device 135. If the display monitoring device 140 directly provides the television operating state data to the data collection facility 180 then the display monitoring device 140 may include a communication device (one shown as 270 in FIG. 2) such as a wired or wireless telephone communication circuit, a cable modem, etc. The data collection facility 180 is configured to process and/or store data received from the display monitoring device 140 and/or the metering device to produce television viewing information.

The service provider 110 may be implemented by any television service provider such as, for example, a cable television service provider 112, a radio frequency (RF) television service provider 114, and/or a satellite television service provider 116. The television 120 receives a plurality of television signals transmitted via a plurality of channels by the service provider 110 and may be adapted to process and display television signals provided in any format such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc.

The user-operated remote control device 125 allows a user to cause the television 120 to tune to and receive signals transmitted on a desired channel, and to cause the television 120 to process and present the programming content contained in the signals transmitted on the desired channel. The processing performed by the television 120 may include, for example, extracting a video and/or an audio component delivered via the received signal, causing the video component to be displayed on a screen/display associated with the television 120, and causing the audio component to be emitted by speakers associated with the television 120. The programming content contained in the television signal may include, for example, a television program, a movie, an advertisement, a video game, and/or a preview of other programming content that is currently offered or will be offered in the future by the service provider 110.

While the components shown in FIG. 1 are depicted as separate structures within the television system 100, the functions performed by some of these structures may be integrated within a single unit or may be implemented using two or more separate components. For example, although the television 120, the STB 130 and the metering device 135 are depicted as separate structures, persons of ordinary skill in the art will readily appreciate that the television 120, the STB 130, and/or the metering device 135 may be integrated into a single unit. In another example, the STB 130, the metering device 135 and/or the display monitoring device 140 may also be integrated into a single unit. In fact, the television 120, the STB 130, the metering device 135, and the display monitoring device 140 may all be integrated into a single unit.

Figure 2:
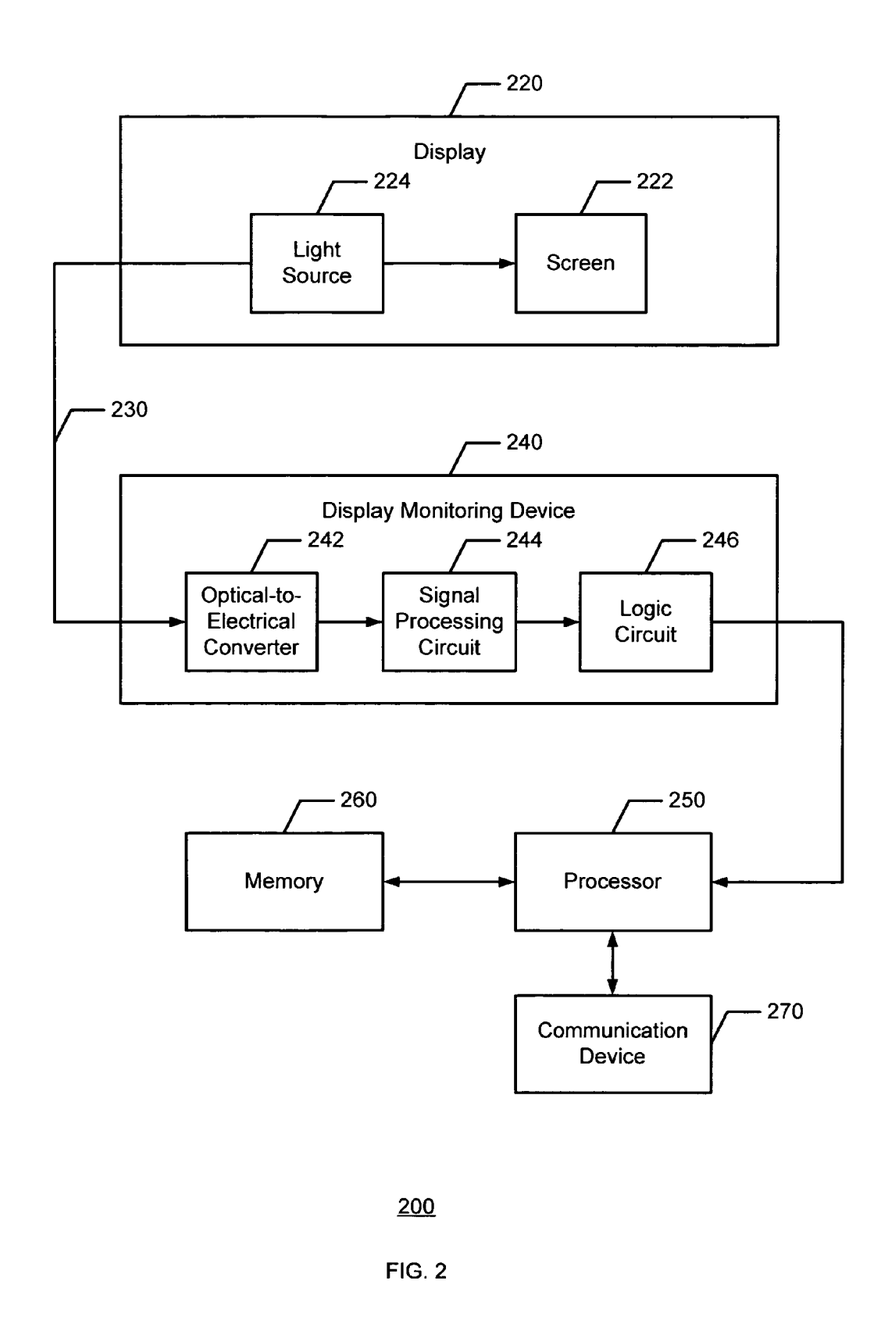
FIG. 2 is a block diagram representation of an example display monitoring system.

In the example of FIG. 2, the illustrated display monitoring system 200 includes a display 220 (a television, a monitor, and/or other media output device) and a display monitoring device 240. The display 220 may be implemented by any desired type of display such as a liquid crystal (LCD), and a plasma display. The display 220 includes a screen 222 and a light energy source 224. The light energy source 224 emits light energy for projecting images on the screen 222 when power is applied to the display 220 (i.e., the display 220 is turned on). The light energy source 224 is turned off when no power is applied to the display 220 or when the display 220 enters a standby state, a sleep state, and/or a power save state (i.e., power is applied to the display 220 but the screen 222 is blank).

The display monitoring device 240 is optically coupled to the light energy source 224 of the display 220 via an optical fiber 230 (e.g., plastic or glass). In particular, the display monitoring device 240 includes an optical-to-electrical converter 242, a signal processing circuit 244, and a logic circuit 246. The optical-to-electrical converter 242 may be a photodetector, a photodiode and/or any suitable light-sensitive semiconductor junction device configured to convert light energy emitted by the light energy source 224 via the optical fiber 230 into an electrical signal. The electrical signal is provided to the signal processing circuit 244 and the logic circuit 246. The signal processing circuit 244 amplifies the electrical signal to a particular voltage level and filters noise and/or other extraneous signals from the electrical signal so that the logic circuit 246 may generate an output signal indicative of an operating state of the display 220 based on the electrical signal as described in detail below.

When the logic circuit 246 receives the electrical signal from the signal processing circuit 244, the logic circuit 246 generates an output signal indicative of an operating state of the display 220. In particular, the output signal indicates either an on state or an off state of the display 220. For example, the logic circuit 246 may generate a HIGH signal (i.e., a logic "1") to indicate that the display 220 is turned on (i.e., light energy to project images on the screen 222 is detected). In contrast, the logic circuit 246 may generate a LOW signal (i.e., a logic "0") to indicate that the display 220 is turned off (i.e., no light energy to project images on the screen 222 is detected).

A processor 250 may use the output signal indicative of the operating state of the display 220 to track when and how long the display 220 is turned on or off. For example, the processor 250 may generate a time stamp corresponding to the time when the processor 250 receives a HIGH signal as the output signal. The processor 250 may generate another time stamp when the processor 250 receives a LOW signal as the output signal. The processor 250 is operatively coupled to a memory 260 to store the on/off information. The memory 260 may be implemented by any type of memory such as a volatile memory (e.g., random access memory (RAM)), a nonvolatile memory (e.g., flash memory) or other mass storage device (e.g., a floppy disk, a CD, and a DVD). Based on the time stamps corresponding to the output signals from the logic circuit 246, the processor 250 may automatically provide operating information (e.g., when the display 220 was turned on or off) to the data collection facility 180 via a communication device 270 (e.g., a wired or wireless telephone communication circuit, a cable modem, etc.). As noted above, the data collection facility 180 is configured to produce television viewing data. For example, the data collection facility 180 may use the on/off information to determine a total number of hours that the household members 160 watch television.

While the components shown in FIG. 2 are depicted as separate structures within the display monitoring system 200, the functions performed by some of these structures may be integrated within a single unit or may be implemented using two or more separate components. For example, although the display monitoring device 240 and the processor 250 are depicted as separate structures, persons of ordinary skill in the art will readily appreciate that the display monitoring device 240 and the processor 250 may be integrated into a single unit. Further, the processor 250 may be configured to generate the output signal indicative of the operating state of the display 220 based on the electrical signal from the signal processing circuit 244. The memory 260 may also be integrated into the display monitoring device 240.

Figure 3:
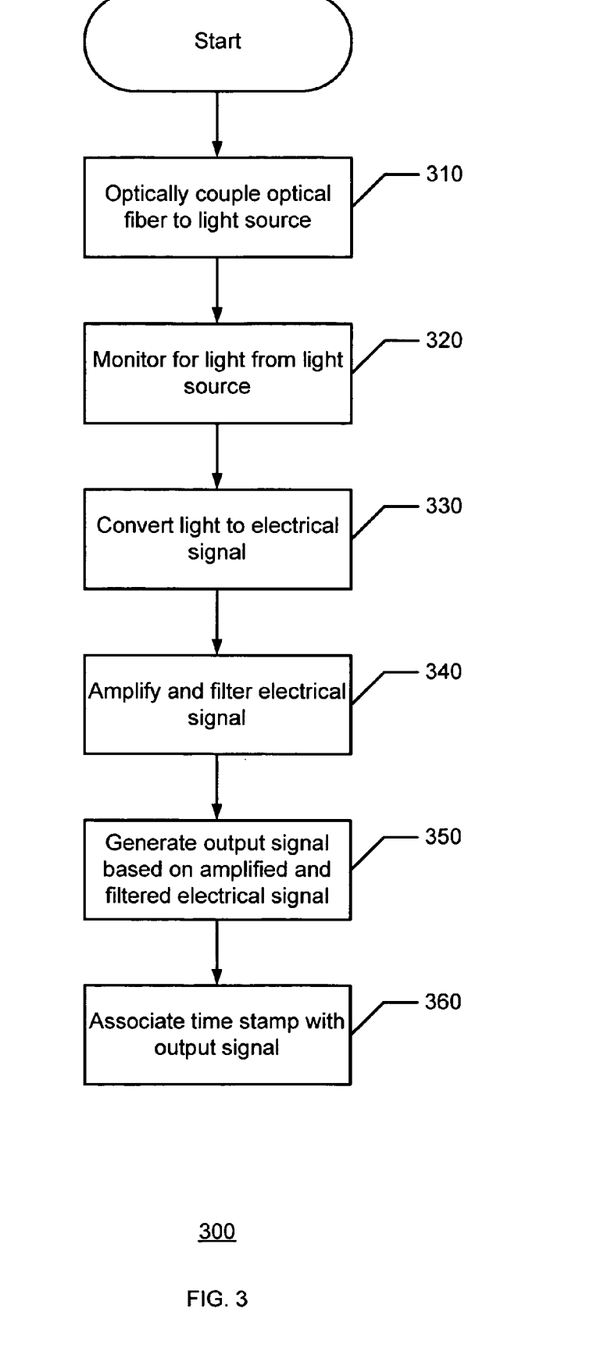
FIG. 3 is a flow diagram representation to detect an operating state of a display.

An example method which may be executed to detect an operating state of a display is illustrated in FIG. 3. Persons of ordinary skill in the art will appreciate that the method can be implemented in any of many different ways. Further, although a particular order of actions is illustrated in FIG. 3, persons of ordinary skill in the art will appreciate that these actions can be performed in other temporal sequences. The flow chart 300 is merely provided as an example of one way to use the display monitoring device 240 to detect an operating state of the display 220.

In the example of FIG. 3, the optical fiber 230 is optically coupled to the light energy source 224 associated with the display 220 (block 310). As noted above, the light energy source 224 is configured to emit light energy for projecting images on the screen 222 of the display 220. The display monitoring device 240 monitors for light energy from the light energy source 224 via the optical fiber 230 (block 320). The optical-to-electrical converter 242 converts light energy from the light energy source 224 to an electrical signal (block 330). The signal processing circuit 244 amplifies the electrical signal to a particular voltage level and filters extraneous signals (e.g., noise) from the electrical signal so that the electrical signal may be processed by the logic circuit 246 (block 340). Based on the amplified and filtered electrical signal, the logic circuit 246 generates an output signal indicative of an operating state of the display (block 350). In particular, the output signal is indicative of wither the display 220 is in an on state or an off state. For example, the logic circuit 246 may generate a HIGH signal (i.e., a logic "1") to indicate that the display 220 is turned on. Alternatively, the logic circuit 246 may generate a LOW signal (i.e., a logic "0") to indicate that the display 220 is turned off including a standby state where the screen 222 is blank.

Whenever there is a change in the state of the output signal from the logic circuit 246, the processor 250 may generate a time stamp (block 360). For example, when the processor 250 first detects a HIGH signal from the logic circuit 246, the processor 250 generates a time stamp and stores data indicating that the display 220 entered an on state at the time indicated by the time stamp. When the processor 250 detects a LOW signal from the logic circuit 246, it generates a time stamp and stores data indicating that the display 220 entered an off state at the time indicated by the time stamp. This operating information (e.g., when the display 210 was turned on or off) may be provided to the data collection facility 180 and/or provided to the metering device 135 that subsequently transmits the operating information to the data collection facility 180. The operating information may be used to produce television audience statistics. As noted above, the operating information may be used to determine a number of hours of that the household members 160 watch television. Further, as noted above, the operating information may also be used to reduce and/or to filter out data that is collected by the metering device 135. The data collection facility 180 may also use the operating information to separate the viewing data corresponding to programming content that were actually displayed from the viewing data corresponding to programming content that were merely provided to the television 120 when the television 120 was turned off.

While the methods and apparatus disclosed herein are particularly well suited for use with an LCD, the teachings of the disclosure may be applied to detect an operating state of other types of displays. For example, the methods and apparatus disclosed herein may detect an operating state of a plasma display. In addition to a television, the methods and apparatus disclosed herein may detect an operating state of a computer monitor, a projector screen, and/or other media output device. Thus, the methods and apparatus disclosed herein may collect data associated with Internet usage and/or other display of media via a computer.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A device to detect an operating state of a display, the device comprising:
    an optical fiber optically coupled to a light source of the display, the light source being configured to emit light;
    an optical-to-electrical converter coupled to the light source via the optical fiber, the optical-to-electrical converter being configured to convert light from the light source into an electrical signal;
    a logic circuit in communication with the optical-to-electrical converter, the logic circuit being configured to generate an output signal indicative of the operating state of the display based on the electrical signal; and
    an audience measurement device, wherein the output signal is used to control the audience measurement device to collect audience measurement data to identify displayed content based on the operating state of the display.

2. The device as defined in claim 1, wherein the optical fiber comprises at least one of a plastic optical fiber and a glass optical fiber.

3. The device as defined in claim 1, the display is one of a liquid crystal display (LCD) and a plasma display.

4. The device as defined in claim 1, wherein the optical-to-electrical converter comprises at least one of a photodetector, a photodiode, and a light-sensitive semiconductor junction device.

5. The device as defined in claim 1, wherein the operating state of the display comprises at least one of an on state and an off state.

6. The device as defined in claim 1, wherein the output signal comprises at least one of a high signal and a low signal.

7. The device as defined in claim 1 further comprising a signal processing circuit coupled to the optical-to-electrical converter and the processor, the signal processing circuit configured to amplify and to filter the electrical signal.

8. The device as defined in claim 1 further comprising a processor in communication with the logic circuit, the processor being configured to associate a time stamp with the output signal from the logic circuit and to provide operating information associated with the display to a data collection facility.

9. The device as defined in claim 1, wherein the device is integrated into a set top box (STB).

10. The device as defined in claim 1, wherein the light source is located behind a screen of the display.

11. A system to detect an operating state of a display having a light source configured to emit light comprising:
a display monitoring device optically coupled to the light source of the display via an optical fiber, the display monitoring device being configured to convert light from the light source into an electrical signal indicative of the operating state of the display, wherein the operating state of the display comprises at least one of an on state and an off state, the electrical signal is combined with data collected by a metering device (a) to determine whether data collected by the metering device corresponds to signals including media content that were actually displayed on the display based on the operating state of the display, and (b) to separate first viewing data corresponding to the media content actually displayed on the display in an on state from second viewing data provided to the display in an off state.

12. A system as defined in claim 11, wherein the optical fiber comprises at least one of a plastic optical fiber and a glass optical fiber.

13. A system as defined in claim 11, wherein the display is one of a liquid crystal display (LCD), a plasma display, and a cathode ray tube (CRT) display.

14. A system as defined in claim 11, wherein the display monitoring device comprises an optical-to-electrical converter optically coupled to the light source via the optical fiber, the optical-to-electrical converter being configured to convert light from the light source into an electrical signal.

15. A system as defined in claim 14, wherein the display monitoring device comprises a logic circuit in communication with the optical-to-electrical converter, the logic circuit being configured to generate an output signal indicative of the operating state of the display based on the electrical signal.

16. A system as defined in claim 15, wherein the output signal comprises at least one of a high signal and a low signal.

17. A system as defined in claim 15 further comprising a processor in communication with the logic circuit, the processor being configured to associate a time stamp with the output signal from the logic circuit and to provide operating information associated with the display to a data collection facility.

18. A system as defined in claim 14, wherein the display monitoring device comprises a signal processing circuit in communication with the optical-to-electrical converter and the processor, the signal processing circuit configured to amplify and to filter the electrical signal.

19. A system as defined in claim 11, wherein the display monitoring device is integrated into a set top box (STB).

20. A method to detect an operating state of a display comprising:
optically coupling an optical fiber to a light source associated with the display, the light source being configured to emit light;
converting light from the light source to an electrical signal;
generating an output signal indicative of the operating state of the display based on the electrical signal; and
selectively triggering a metering device to collect audience measurement data based on the operating state of the display as indicated by the electrical signal.

21. A method as defined in claim 20, wherein optically coupling the optical fiber to the light source associated with the display comprises optically coupling one of a plastic optical fiber and a glass optical fiber to the light source associated with the display.

22. A method as defined in claim 20, wherein the display is one of a liquid crystal display (LCD) and plasma display.

23. A method as defined in claim 20, wherein generating the output signal indicative of the operating state of the display comprises amplifying and filtering the electrical signal.

24. A method as defined in claim 20, wherein the output signal is indicative of at least one of an on state and an off state of the display.

25. A method as defined in claim 20 further comprising associating a time stamp with the output signal.

26. A method as defined in claim 20 further comprising providing operating information associated with the display to a data collection facility.

* * * * *